3,347,961
METHOD AND APPARATUS FOR THE TREATMENT OF EXPANDABLE RESINOUS PARTICLES
David L. Russell, Midland, Mich., assignor to The Dow Chemical Company, Midland, Mich., a corporation of Delaware
Filed May 28, 1964, Ser. No. 370,957
9 Claims. (Cl. 264—53)

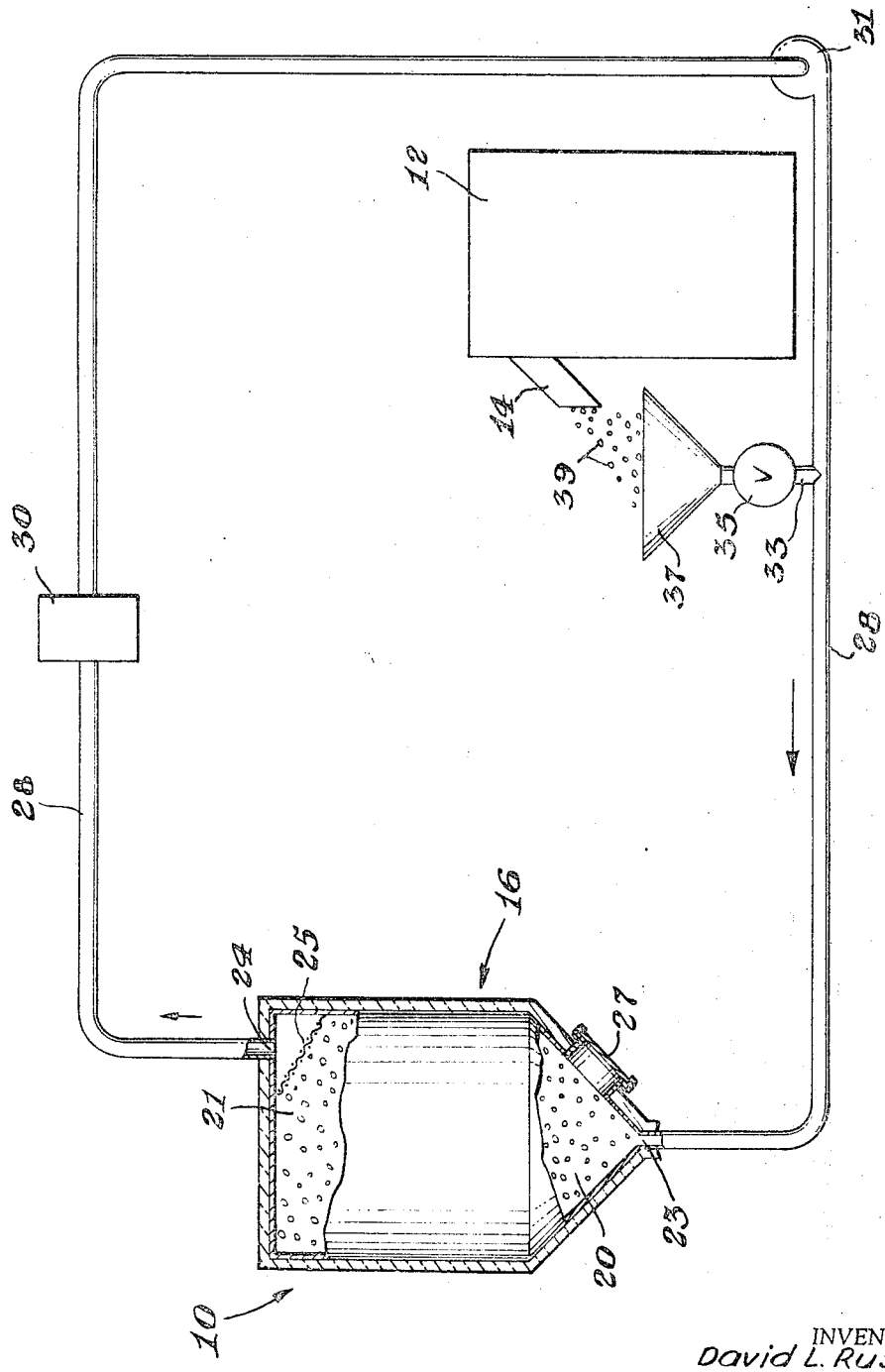

ABSTRACT OF THE DISCLOSURE

A method and apparatus are shown for preparing expanded synthetic resinous particles having a density of from about 0.3 to about 0.8 pound per cubic foot. Preexpanded particles are heat aged from 10 to 50 hours at a temperature of 80° F. to 200° F. in a moving stream of air.

---

This invention relates to a method and apparatus for the treatment of thermoplastic resinous particles. It more particularly relates to a method and apparatus for the stabilization of such particles.

United States Patents 2,744,291 and 2,787,809 disclose processes for the formation of cellular products wherein small particles of synthetic thermoplastic resins having a volatile liquid blowing agent dispersed therethrough are subjected to heat in a perforated mold to form a cellular product which conforms to the shape of the mold. Much difficulty has been encountered in preparing low density molded products having an apparent density in the range of about 0.3 to about 0.8 pound per cubic foot. Beneficially such low density expanded synthetic resinous bodies are prepared employing pre-expanded particles having a bulk density approximating the bulk density of the desired end product. Oftentimes it is desirable to prepare a molded article which has a density slightly greater than the bulk density of the expanded particles in order to obtain maximum bonding of the particles to each other. Low density expanded thermoplastic resinous particles often are prepared utilizing a cycle foaming technique such as that set forth in United States Patent 2,884,386. Oftentimes when low density particles prepared by conventional foaming techniques they collapse on cooling and therefore frequently are unsatisfactory for the preparation of low density moldings.

It is an object of this invention to provide an improved method and apparatus for the preparation of expanded low density thermoplastic resinous materials.

A further object of the invention is to provide an expanded low density thermoplastic particulate material having excellent dimensional stability.

A further object of the invention is to provide a simple method and apparatus for preparing stable expanded thermoplastic resinous particles having a low bulk density.

These features and other advantages in accordance with the method of the present invention are achieved by heating a particulate synthetic thermoplastic resinous material containing an expanding agent to form a fully expanded product having a density in the range of about 0.3 to 0.8 pound per cubic foot, subjecting the expanded particles, after the expansion thereof and before the particles can cool sufficiently to collapse, to air at a temperature of between about 80° Fahrenheit to 200° Fahrenheit for a period of time of from about 10 to about 50 hours.

The method of the invention is advantageously practiced by an apparatus which comprises in cooperative combination means to foam particulate thermoplastic resinous material to particles having a density of from about 0.3 to about 0.8 pound per cubic foot, means to transfer the foamed particles to a holding vessel, the vessel having an inlet and an outlet, the outlet being in cooperative combination with a heater, and a blower adapted to withdraw gas from the particle retainer and to discharge the gas withdrawn from the particle retainer into the inlet thereof, the inlet and outlet being so constructed and arranged that particles within the particle retainer are subjected to a current of air.

Further features and advantages in accordance with the invention become more apparent when taken in connection with the following specification and drawing wherein:

The drawing schematically represents an apparatus in accordance with the invention generally designated by the reference numeral 10. The apparatus 10 comprises in cooperative combination a particle foaming means 12 having an outlet 14, a particle holding vessel 16, having a bottom or lower portion 20 and an upper portion 21. An inlet 23 is provided in the bottom 20 and an outlet 24 is disposed in the upper portion 21. Generally adjacent the inlet 24 is a screen or perforate plate 25. Formed in the lower portion of the retainer is a closure 27 so constructed and arranged so as to permit the removal of contents of the vessel 16. A conduit 28 provides communication between the inlet 23 and outlet 24. Interposed in the conduit 28 is a heater 30, a blower or air forwarding device 31 and a feed port 33. In communication with the feed port 33 of the conduit 28 is a valve 35, adapted to pass particulate solids. Adjacent the valve 35 is a hopper 37 adapted to receive expanded thermoplastic resinous particles 39 from the outlet 14 of prefoamer 12. In operation of the apparatus 10, thermoplastic resinous particles are expanded to a desired bulk density and discharged into the hopper 37 from the outlet 14 while being maintained at a temperature above about 80° Fahrenheit. The particles 39 are passed through the valve 33 into the conduit 28 where they are carried in a stream of air from the blower and moving in the direction of the arrow. The particles are held in the vessel 16 and advantageously maintained in a fluidized condition. The air is removed from the vessel 16 through the outlet 24 via the conduit 28, through the heater 30 and recycled to the blower 31. Thus the particles are subjected to constant exposure to air at a desired temperature for a required period of time and are subsequently removed from the vessel 16 by opening the closure 27. The low density particles may then be processed in the conventional manner.

The method and apparatus of the invention is particularly adapted to be used with expanded, closed cell thermoplastic resinous material having a raising agent which has a gas diffusion rate through the thermoplastic resinous material which is from about 0.75 to 6 times the diffusion rate of the gas in which the expanded resinous material is to be utilized.

A wide variety of thermoplastic resinous materials may be used in the practice of the present invention. Particularly advantageous are those generally referred to as alkenyl aromatic resins. By an alkenyl aromatic resin is meant a solid polymer of one or more polymerizable alkenyl aromatic compounds. The polymer or copolymer comprises, in chemically combined form, at least 50 percent by weight of at least one alkenyl aromatic compound having the general formula:

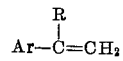

wherein Ar represents an aromatic hydrocarbon radical, or an aromatic halohydrocarbon radical of the benzene series, and R is hydrogen or the methyl radical. Examples of such alkenyl aromatic resins are the solid homopolymers of styrene, α-methylstyrene, ortho-methylstyrene, meta-methylstyrene, para-methylstyrene, ar-ethylstyrene, ar-vinylxylene, ar-chlorostyrene, or ar-bromostyrene; the solid copolymers of two or more of such alkenyl aromatic compounds with minor amounts of other readily polymerizable olefinic compounds such as divinylbenzene, methyl methacrylate, or acrylonitrile, etc.

The practice of the invention is also successful with other thermoplastic resinous materials well known to the art, including these which are comprised of polymers and copolymers of methyl methacrylate, such as its homopolymer and the copolymers thereof with vinylidene chloride; thermoplastic polymers and copolymers of vinyl chloride, including homopolymeric vinyl chloride, thermoplastic ester and ether derivatives of cellulose including cellulose acetate, cellulose propionate, cellulose acetate butyrate, ethyl cellulose, and the like. Plastic resins which are beneficially prepared by the present invention are: chlorinated polyolefins such as chlorinated polyethylene, chlorinated polypropylene and the like, as well as saran resins, which include thermoplastic copolymers of vinylidene chloride with one or more such monomers as vinyl chloride, acrylate esters such as ethyl acrylate, propyl acrylate, and the like.

Such materials are well known in the art as are processes and methods for admixing such resins with volatile raising agents and extruding into cellular shaped bodies as well as techniques for preparing particulate expandable thermoplastic resinous compositions. The particulate expandable thermoplastic resinous compositions most often are utilized for molding of foamed or cellular articles which is usually accomplished by prefoaming the particles to a portion of their ultimate volume, placing them within a closed mold, subsequently heating the particles to foam them and bond them together into a unitary embodiment.

A wide variety of volatile fluid foaming agents can be utilized in the practice of the present invention. They include such materials as the aliphatic hydrocarbons including ethane, ethylene, propane, propylene, butane, butylene, isobutane, pentane, neopentane, isopentane, hexane, heptane, and mixtures thereof, as well as chlorinated and fluorinated and chlorofluorinated hydrocarbons. When utilized with the alkenyl aromatic resins generally the boiling point of such materials should not be greater than about 95° centigrade at 760 millimeters of mercury absolute pressure. Other suitable fluid foaming agents are the perchlorofluorocarbons such as:

$CCl_3F$      $CCl_2F$—$CCl_2F$
$CCl_2F_2$      $CClF_2$—$CCl_2F_2$
$CClF_3$      $CClF_2$—$CClF_2$

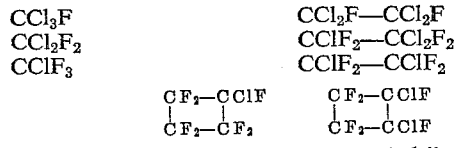

and tetraalkyl silanes such as tetramethylsilane, trimethylsilane, trimethylisopropylsilane and trimethyl n-propylsilane, having a boiling point not higher than 95° centigrade at 760 millimeters absolute pressure. The volatile fluid foaming agent is employed in amount corresponding to from about 0.05 to 0.4 gram molecular proportion of the volatile fluid compound per 100 grams by weight of the normally solid thermoplastic polymer starting material. Beneficially, such fluid or raising agents may be incorporated into the thermoplastic resinous material at any suitable time prior to the preparation of the foamed body according to methods well known to the art. It is essential to the practice of the present invention that the raising agents incorporated within the polymeric material have a vapor transmission rate of from about 0.75 to 6 times the transmission rate of the gas within which the foamed body is to reside. That is, a foamed plastic body which is to be cured and used in air must have a blowing agent added thereto which has a vapor transmission rate through the resin lying within the above delineated limits. Preferably, for maximum dimensional stability the blowing agent mixture should have a vapor transmission rate from about 0.75 to 3 times the rate of transmission through the polymeric material. Various and different characteristics are imparted to the foamed plastic body by the blowing agents. For specific applications blowing agents imparting the desired characteristics are employed. For example, such factors as toxicity, fire hazard, thermal conductivity, the economic cost, as well as, in certain instances, the solubility of the blowing agent in the polymer. For example, if a foam has been prepared by an extrusion technique, generally it is desirable that the melt viscosity of the polymer at the extrusion temperature be reduced to a relatively low value in order to achieve maximum output for a particular piece of equipment and to require minimum energy or power input. Methyl chloride, for example, has a vapor transmission rate through polystyrene of about 1,000 cubic centimeters at 25° centigrade and absolute pressure of 1 atmosphere per mil of polymer thickness per 24 hour period per 100 square inches of exposed surface with a pressure differential of one atmosphere across the polymer sheet being tested at a temperature of 25° centigrade. Under identical conditions a material such as difluorodichloromethane has a transmission rate through polystyrene of about 17 cubic centimeters of gas under 1 atmosphere at 25° centigrade. The transmission rate for air is 108 cubic centimeters of gas under 1 atmosphere at 25° centigrade, oxygen about 300 cubic centimeters (1 atmosphere at 25° centigrade) and nitrogen about 60 cubic centimeters (1 atmosphere at 25° centigrade).

The precise time and temperature for optimum conditioning of the low density expanded particles will vary slightly with the composition of the polymer and with the composition of the blowing agent employed. For example, when low density foamed thermoplastic resinous particles having a bulk density of from about 0.3 to about 0.8 pound per cubic foot are prepared from copolymers of styrene and acrylonitrile wherein polymerized styrene is present in proportions of from about 60–90 weight percent of the copolymer and acrylonitrile is present in a proportion of from about 40–10 percent. The air temperature should be maintained between about 80° Fahrenheit and about 200° Fahrenheit and processing time will vary from about 10 hours to about 50 hours. If the treatment of the low temperature foams is carried out at temperatures below 80° Fahrenheit the particles will tend to collapse and if the temperature exceeds about 200° Fahrenheit the particles will tend to melt or sinter and lose their desired cellular structure. If processing times of less than about 10 hours are employed, equilibrium has not been approached sufficiently closely and the particles tend to collapse and for processing times in excess of 50 hours no added benefits are achieved. Treatment of expanded thermoplastic resinous particles is readily carried out at or about atmospheric pressure. Generally minor differences in pressure such as about ±1 pound per square inch does not effect the stabilization. However, pressures outside of this region may result in collapse of the particle either after treatment or when admitted to the treating zone. Beneficially for a copolymer of styrene and acrylonitrile having a composition of 72 percent by weight styrene and 28 percent by weight acrylonitrile containing about 11 percent by weight based on the combined weight of the polymer and the blowing agent of a blowing agent consisting of a mixture of 3 parts by weight of pentane and 2 parts by weight of trichlorofluoromethane, the optimum processing range appears to be from about 120° Fahrenheit to about 140° Fahrenheit, over a period of from about 14 to 20 hours. Usually as the temperature is increased the treatment time is decreased. The criticality in treating the particles is in subjecting to a suitable exposure to heated air for a length of time sufficient that they do not collapse. Periods of time in excess of the treating time generally do not harm the particles, nor is any particular benefit derived therefrom unless it is a convenient means of storage. At temperatures approaching 200° Fahrenheit extended exposure, that is, exposure greatly in excess of 50 hours and is not desirable, as the long term heat stability of the polymer occasionally is adversely affected.

By way of further illustration, employing an arrangement substantially as shown in the drawing, a polymer of 72 weight percent styrene and 28 weight percent acrylonitrile containing 10.2 weight percent of a mixture of 3:2 parts by weight of pentane and trichlorofluoromethane, weight percentage being based on the combined weight of the polymer and blowing agent, was prefoamed by means of exposure to steam at a temperature of about 218° Fahrenheit until a bulk density of about 0.41 pound per cubic foot was obtained. The particles were discharged from the prefoaming apparatus and fed into the conduit 28 in such a manner that their temperature did not fall below about 120° Fahrenheit. The air in the stabilizing apparatus was maintained at a temperature of 130° Fahrenheit for a period of 16 hours. The particles were subsequently removed and permitted to cool to about 73° Fahrenheit. No tendency was observed for the particles to collapse and the resultant bulk density was about 0.40. The particles were subsequently placed in a perforated mold and subjected to steam at about atmospheric pressure and molded into a generally cylindrical billet having a volume of about 65 cubic feet. The resultant foam billet was light, odorless and had a density of about 0.42 pound per cubic foot.

In a manner similar to the foregoing, a plurality of other samples were prepared at varying densities and the results are set forth in the following table.

fluoroethane; 50 parts of methyl chloride and 50 parts of dichlorotetrafluoroethane; 40 parts of methyl chloride and 50 parts of dichlorotetrafluoroethane and 10 parts of trichlorofluoromethane; 40 parts of methyl chloride, 50 parts of dichlorotetrafluoroethane and 10 parts of trichlorotrifluoroethane. Similar beneficial results are achieved when such blowing agent mixtures are utilized with polymers of styrene such as styrene acrylonitrile polymers containing 70 percent styrene and 30 percent acrylonitrile, 80 percent styrene and 20 percent vinyl toluene, polymers of tertiary-butyl styrene, copolymers of styrene and methyl methacrylate such as those containing 75 percent styrene and 25 percent methyl methacrylate.

Similar beneficial and advantageous dimensional stability is also achieved when polymers such as polyvinyl chloride, copolymers of vinyl chloride vinyl acetate, vinyl chloride vinylidene chloride, vinyl chloride vinyl acetate are expanded utilizing blowing agents having a permeability rate of from .75 to 6 times that of air.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be

TABLE

| Sample No. | Density, lb./ft.$^3$ | Compressive Strength, 5% | P.s.i., 10% | Flex Strength, p.s.i. | Flex Def., inches | Percent Bead Fracture | Water ABS, lb./ft.$^2$ | Tensile Strength | | Torsion Strength, degs. | Mandrel Bend of 5 |
|---|---|---|---|---|---|---|---|---|---|---|---|
| | | | | | | | | 1 p.s.i. | 1 p.s.i. | | |
| 1 | .561 | 5.0 | 7.5 | 17.41 | 1.16 | 60 | .022 | 11.3 | 11.8 | 177 | 3.7 |
| 2 | .542 | 6.5 | 8.2 | 15.21 | 1.45 | 55 | .022 | 11.8 | 11.2 | 138 | 4.3 |
| 3 | .586 | 5.5 | 7.5 | 17.26 | 1.00 | 60 | .022 | 14.8 | 13.7 | 156 | 4.3 |
| 4 | .553 | 5.2 | 6.9 | 14.26 | .77 | 40 | .026 | 13.1 | 11.7 | 174 | 3.0 |
| 5 | .568 | 5.5 | 8.1 | 14.06 | 1.14 | 15 | .023 | 12.7 | 12.4 | 210 | 3.0 |
| 6 | .612 | 2.7 | 5.8 | 14.34 | 1.92 | 80 | | 13.6 | 13.1 | 276 | 1.9 |
| 7 | .635 | 2.7 | 6.2 | 17.44 | 1.69 | 80 | .017 | 14.8 | 14.2 | 276 | 1.0 |
| 8 | .771 | 1.7 | 5.8 | 20.80 | 1.86 | 95 | .023 | 17.9 | 17.9 | 276 | 1.0 |
| 9 | .681 | 1.7 | 5.5 | 20.66 | 1.84 | 90 | | 16.2 | 15.0 | 240 | 1.1 |
| 10 | .517 | 2.7 | 5.9 | 19.55 | 2.13 | 80 | .022 | 11.9 | 12.6 | 186 | 2.1 |

Compressive strength was measured on a 4 inch by 4 inch surface of a foam sample and weights added until the thickness was reduced by 5 and 10 percent.

The flexural strength was determined in accordance with ASTM D790–T. Bead fracture is a measure of the bonding of the particles to one another. A sample of foam is broken and the percentage of the particles or beads broken per unit area is determined. Water absorption is determined in accordance with ASTM C272.

Tensile strength is determined in accordance with ASTM D1623–59T.

The torsion strength is determined by twisting a sample measuring ½ inch by 1 inch by 10 inches about its longitudinal axis by means of a pair of jaws spaced 1 inch apart and rotating one of the jaws about the longitudinal axis of the sample at a speed of 1 revolution per minute. The rotation of the rotatable jaw at rupture is measured in degrees.

The mandrel bend test is a measure of flexibility and is conducted by bending a sample measuring one quarter inch in thickness, ½ inch in width and 5 inches in length about mandrels varying in diameter by increments of 1 inch.

The sample is placed with its broadest face against the mandrel and manually conformed thereto in a circumferential manner. The minimum diameter of mandrel required to cause rupture of the samples is noted in 5 cases and the average thereof is taken.

Similar advantageous and beneficial results in accordance with the present invention are achieved by expandable thermoplastic resinous particles utilizing as blowing agents mixtures of 60 parts of methyl chloride and 40 parts of dichlorodifluoromethane; 30 parts of methyl chloride, 30 parts of neopentane and 40 parts of dichlorodifluoromethane; 50 parts of methyl chloride, 25 parts of difluorodichloromethane and 25 parts of dichlorotetraconstrued or interpreted as being restrictive or otherwise limiting of the present invention, excepting as it is set forth and defined in the hereto appended claims.

What is claimed is:

1. A method of preparing stable low density particulate synthetic resinous material comprising heating a particulate synthetic thermoplastic resinous material containing a blowing or expanding agent to form a fully expanded product having a density of from about 0.3 to about 0.8 pound per cubic foot, the expanding agent having a diffusion rate through the resinous material which is from about 0.75 to 6 times the diffusion rate of air through the resinous material, subjecting the expanded particles, immediately after the expansion thereof and before the particles can cool sufficiently to collapse, to air at a temperature of from about 80° Fahrenheit to 200° Fahrenheit for a period of time of from about 10 to 50 hours which is sufficient to prevent collapse of the expanded particles on cooling to 60° Fahrenheit, and subsequently cooling the particles.

2. The method of claim 1 wherein the expandable thermoplastic resinous material is a copolymer of from about 60 to 90 parts of styrene and from about 40–10 parts of acrylonitrile.

3. The method of claim 2 wherein the expanding agent is present in the particulate material in a proportion of from about 9 to 13 percent by weight of the combined weight of the copolymer and expanding agent.

4. The method of claim 3 wherein the blowing agent comprises a mixture of about 60 parts of pentane and 40 parts of trichlorofluoromethane.

5. The method of claim 4 wherein the temperature is from about 120° Fahrenheit to about 140° Fahrenheit.

6. The method of claim 5 wherein the treatment period is from about 14 to about 20 hours.

7. The method of claim 6 wherein the treatment is carried out at about atmospheric pressure.

8. An apparatus for the treatment of particulate thermoplastic resinous material comprising in cooperative combination means to foam a particulate thermoplastic resinous material to particles having a density of from about 0.3 to about 0.8 pound per cubic foot, means to transfer the foamed particles to a particle holding vessel, the holding vessel having an inlet and an outlet, the outlet being in cooperative combination with a heater and a blower adapted to withdraw air from the vessel and to discharge the air withdrawn from the vessel into the inlet thereof, the inlet and outlet being generally oppositely disposed from each other so that particles within the vessel are subjected to a current of air, and means to remove the particles from the vessel.

9. The apparatus of claim 8 wherein the holding vessel is a hopper having a top and bottom, said inlet being positioned at the bottom of said hopper and the outlet being positioned at the top of the hopper.

References Cited

UNITED STATES PATENTS

| | | |
|---|---|---|
| 329,490 | 11/1885 | Salzgeber. |
| 1,871,773 | 8/1932 | Bennett _____ 34—57 |
| 1,912,910 | 6/1933 | Newman et al. _____ 34—57 XR |
| 3,207,820 | 9/1965 | Scarvelis et al. _____ 264—53 |
| 3,238,634 | 3/1966 | Goins _____ 264—21 XR |
| 3,252,228 | 5/1966 | Ehrenfreund _____ 264—53 XR |
| 3,255,286 | 6/1966 | Luc-Belmont _____ 264—109 |

FOREIGN PATENTS

| | | |
|---|---|---|
| 637,029 | 2/1962 | Canada. |
| 592,354 | 9/1947 | Great Britain. |
| 613,697 | 7/1958 | Italy. |

ALEXANDER H. BRODMERKEL, *Primary Examiner.*

P. E. ANDERSON, *Assistant Examiner.*